United States Patent
Smith et al.

(10) Patent No.: US 9,604,423 B2
(45) Date of Patent: Mar. 28, 2017

(54) TIRE MOLD WITH IMPROVED DURABILITY

(71) Applicants: Compagnie Generale des Etablissements Michelin, Clermont-Ferrand (FR); Michelin Recherche et Technique S.A., Granges-Paccot (CH)

(72) Inventors: James Todd Smith, Anderson, SC (US); Jerry Hinson, Boiling Springs, SC (US); Marvin Glen Owen, Williamston, SC (US); Thomas Gregory Petrina, Jr., Moore, SC (US); Frederick David Stringer, Jr., Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/898,271

(22) PCT Filed: Jun. 28, 2013

(86) PCT No.: PCT/US2013/048585
§ 371 (c)(1),
(2) Date: Dec. 14, 2015

(87) PCT Pub. No.: WO2014/209367
PCT Pub. Date: Dec. 31, 2014

(65) Prior Publication Data
US 2016/0129653 A1 May 12, 2016

(51) Int. Cl.
*B29D 30/06* (2006.01)

(52) U.S. Cl.
CPC ..... *B29D 30/0662* (2013.01); *B29D 30/0606* (2013.01); *B29D 30/0629* (2013.01);
(Continued)

(58) Field of Classification Search
CPC ............ B29D 30/0606; B29D 30/0629; B29D 30/0662; B29D 2030/063; B29D 2030/0631
See application file for complete search history.

(56) References Cited

U.S. PATENT DOCUMENTS 3,609,819 A * 10/1971 Searle ................ B29D 30/0629
425/22
3,989,791 A 11/1976 Tippin
(Continued)

FOREIGN PATENT DOCUMENTS

| JP | 2008 023722 | 2/2008 |
| JP | 04-925469 B2 | 4/2012 |
| WO | WO 2008065463 A1 | 6/2008 |

OTHER PUBLICATIONS

PCT International Search Report for PCT/US2013/048585, dated Jun. 28, 2013.

*Primary Examiner* — James Mackey
(74) *Attorney, Agent, or Firm* — Dority & Manning, P.A.

(57) ABSTRACT

A tire mold equipped with features for protecting the tread mold segments from damage is described. One or more impact absorbers are positioned between tread mold segments and operate to preclude contact between the shoulders of the tread mold segments when such are biased back into their original position as a tire is removed from the tire mold. By precluding such contact, the tread mold segments are protected from damage that can affect the appearance of the cured tire.

17 Claims, 8 Drawing Sheets

(52) U.S. Cl.
CPC .............. *B29D 2030/063* (2013.01); *B29D 2030/0631* (2013.01); *B29K 2905/00* (2013.01); *B29K 2905/02* (2013.01)

(56) References Cited

U.S. PATENT DOCUMENTS

| | | | |
|---|---|---|---|
| 4,035,119 A | | 7/1977 | Beres |
| 5,114,334 A | | 5/1992 | Boskovic |
| 5,204,036 A | | 4/1993 | MacMillan |
| 5,639,326 A | * | 6/1997 | Soulalioux ......... B29D 30/0629 156/110.1 |
| 6,039,388 A | | 3/2000 | Choi |
| 6,318,985 B1 | | 11/2001 | Heindel |
| 6,808,377 B1 | | 10/2004 | Loney |
| 7,025,581 B2 | * | 4/2006 | Kata ..................... B29C 33/10 425/46 |
| 7,201,570 B2 | * | 4/2007 | Ohara ................ B29D 30/0629 425/46 |
| 7,637,727 B2 | * | 12/2009 | Hyodo .................. B29C 33/302 425/46 |
| 7,845,050 B2 | | 12/2010 | Pyo |
| 7,937,807 B2 | | 5/2011 | Bereznai |
| 8,016,578 B2 | | 9/2011 | Secchi |
| 8,366,427 B2 | * | 2/2013 | Daviet ............... B29D 30/0629 425/46 |
| 9,056,436 B2 | * | 6/2015 | Yaguchi ............ B29D 30/0629 |
| 2003/0230370 A1 | | 12/2003 | Stubbendieck |
| 2011/0151040 A1 | | 6/2011 | Cuny |

\* cited by examiner

TIRE MOLD WITH IMPROVED DURABILITY

FIELD OF THE INVENTION

The subject matter of the present disclosure relates generally to a tire mold and, more particularly, to a tire mold with features for preventing damage to adjacent tread mold segments when a tire is removed from the mold.

BACKGROUND OF THE INVENTION

In the process of tire production, a green tire is placed into a tire mold and subjected to heat and pressure. Typically, the tire mold is formed from two halves that fold or join together with the tire located therebetween. Steam is used to heat the mold and an internal bladder is pressurized to force the green tire firmly against the tire mold for a predetermined period of time during which the tire is cured while features are molded into the tread and possibly the sidewalls of the tire as well.

After the predetermined period of time, the tire mold is opened to remove the tire from the mold. Parts of the mold that are used to e.g., mold grooves, sipes, and other features into the tread of the tire necessarily project into the rubber materials during the curing and molding process. In order to facilitate removal of the tire from the two halves of the mold, certain parts of the mold—sometimes referred to as tread mold segments—are movable with respect to the mold halves. As such, as the tire is removed from the tire mold, the tread mold segments can move so as to be released from e.g., the tread and sidewall and out of features such as e.g., the grooves and sipes.

Two types of constructions for tire molds can be referred to as a first type and a second type based on the position of the tread mold segments relative to each other when the two halves of the tire mold are separated so as to open the tire mold. In a first type, the tread mold segments of either mold half are typically biased away from each other and towards the line of separation of the mold halves when the mold is opened and the tire is removed. When such mold is closed, the tread mold segments are forced back into contact with each other and against the biasing.

In a second type, the tread mold segments of either mold half are typically biased into contact with each other and away from the line of separation of the mold halves when the mold is open and a tire is removed. More particularly, as a cured tire is removed from the mold, the tread mold segments can move so as to release the tire. For example, the tread mold segments may be movable towards the line of separation of the mold halves and away from each other whereby the tire can be separated from the mold halves. However, once separated from the tire, the tread mold segments are biased back into a position away from the line of separation of the tire mold and into contact with each other.

For the second type, certain problems can occur during molding operations. As the tire is removed after a curing operation, the tread mold segments are biased back into contact with each other as just described. Unfortunately, as the tread mold segments return to this original position, contact between the sides of the tread mold segments can cause damage. This problem can be particularly acute in the manufacture of tires having complex features molded into the sidewalls. These features can cause the tread mold segments to "stick" as the tire is lifted out of the mold and drag one or more of the tread mold segments even further from their original position. Once released, the tread mold segments are biased back to the original position with even greater force, which can damage the tread mold segments at locations where they come into contact with each other. Such damage can scar the tread mold segments and negatively affect the appearance of the tire. This second type of tire mold is used only by way of example of one of the problems in the art. Other tire mold types can also have problems with damage between mold segments.

Accordingly, a tire mold having features for protecting the tread mold segments would be useful. More particularly, a tire mold having features for protecting the tread mold segments from damaging each other as they return into contact with each other upon removal of the tire would be beneficial.

SUMMARY OF THE INVENTION

The present invention provides a tire mold equipped with features for protecting the tread mold segments from damage. One or more impact absorbers are positioned between tread mold segments and operate to preclude contact between the shoulders of the tread mold segments when such are biased back into their original position as a tire is removed from the tire mold. By precluding such contact, the tread mold segments are protected from damage that can affect the appearance of the cured tire. Additional objects and advantages of the invention will be set forth in part in the following description, or may be apparent from the description, or may be learned through practice of the invention.

In one exemplary embodiment of the present invention, a tire mold is provided having an open position and a closed position. The tire mold includes a mold body. A plurality of discrete tread mold segments are positioned circumferentially about the mold body. Each tread mold segment includes a pair of opposing shoulders configured to abut with opposing shoulders of circumferentially adjacent tread mold segments when the tire mold is in the closed position. Each pair of shoulders includes a first shoulder and a second shoulder.

At least one impact absorber is supported by the first shoulder. The impact absorber is configured for movement in and out of the first shoulder and is biased towards a circumferentially adjacent tread mold segment. At least one contact element is supported by the second shoulder. The contact element is positioned in contact with the impact absorber of a circumferentially adjacent tread mold segment in both the open position and the closed position of the tire mold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
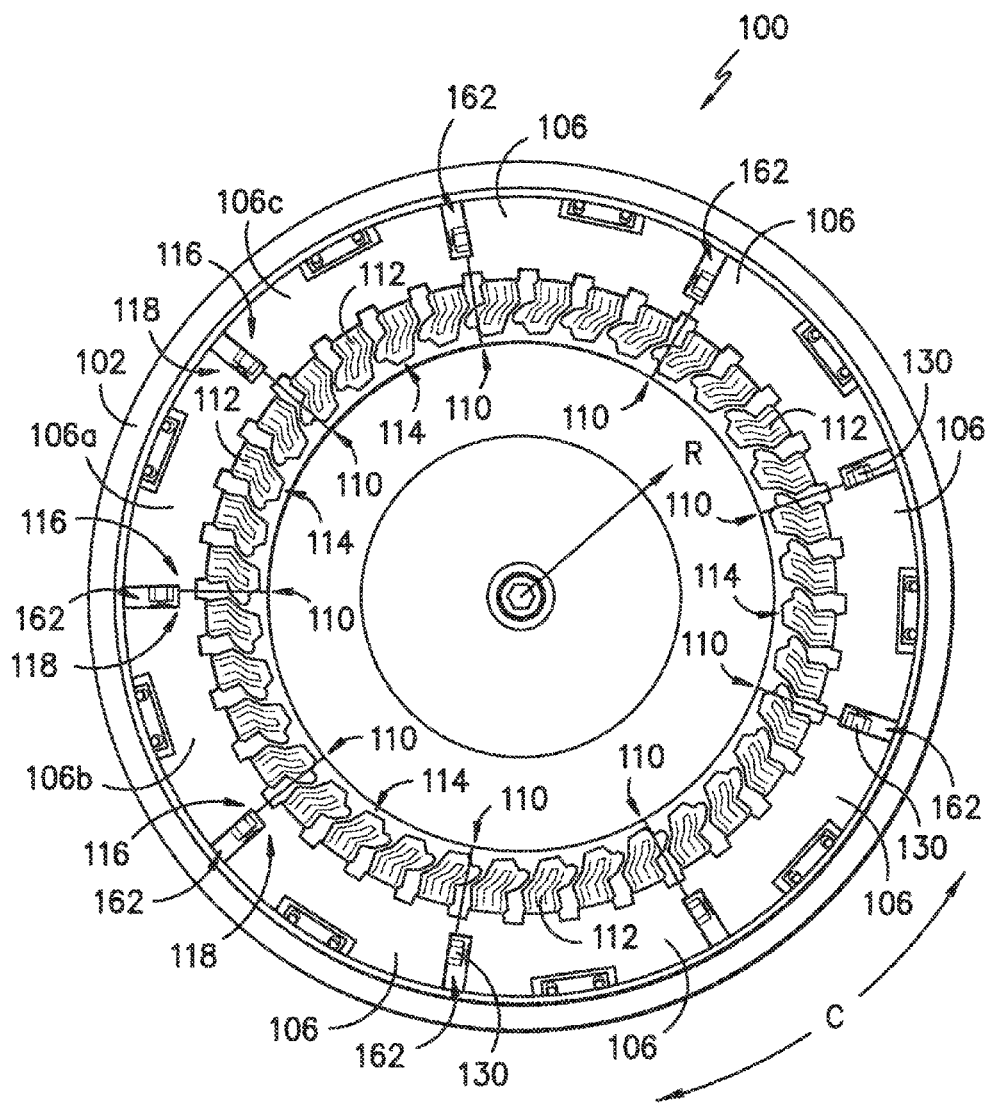
FIG. 1 illustrates a top view of an exemplary embodiment of a mold body of a tire mold of the present invention. For this view, the tread mold segments are shown in a closed position. This top view can represent either the first mold body of the second mold body.

As stated above, with certain mold constructions such as e.g., the second type of tire mold, the tread mold segments are biased into contact with each other even when the mold is opened and a tire is not present. For these mold constructions, certain problems can occur during molding operations. As the tire is removed after a curing operation, because of the biasing, the tread mold segments can damage each other as they move back into contact. This problem can be particularly acute in the manufacture of tires having complex features molded into the sidewalls. These features can cause the tread mold segments to "stick" as the tire is lifted out of the mold and drag one or more of the tread mold segments even further from their original position. Once released, the tread mold segments are biased back to the original position with even greater force, which can damage the tread mold segments at locations where they come into contact with each other. Such damage can scar the tread mold segments and negatively affect the appearance of the tire.

As further described below, the present invention provides a tire mold equipped with features for protecting the tread mold segments from damage as they move towards each other. One or more impact absorbers are positioned between tread mold segments and operate to preclude contact between the shoulders of the tread mold segments when such are biased back into their original position as a tire is removed from the tire mold. By precluding such contact, the tread mold segments are protected from damage that can affect the appearance of the cured tire. While the present invention can be used with the second type of tire mold, it is not limited to such second type and can be used e.g., with a variety of different mold types where it is desirable to provide protection against the impact of adjacent tread mold segments. For purposes of further describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIG. 1 provides a top view of an exemplary first mold body 102 of a tire mold 100 of the second type (referred to above) in an exemplary embodiment of the present invention. Tire mold 100 includes a second mold body 104 (see FIGS. 9A and 9B) having a top view substantially identical to the view shown in FIG. 1. First mold body 102 and second mold body 104 are movable with respect to each other between an open position and a closed position. As used herein, the "open position" means the mold is in a position for placement of a green tire for e.g., vulcanization and molding; and the "closed position" means the tire is secured in place in the mold in the required position for e.g., vulcanization and molding. For the exemplary embodiment of FIG. 1, in the closed position, first and second mold bodies 102 and 104 can be joined together to contact along a line of separation with a green tire (not shown) positioned therebetween during a curing process as known in the art. In the open position, the tire can be removed from tire mold 100 or (if a tire is not present) the mold is ready for receipt of a tire.

As shown in FIG. 1, a first plurality of discrete tread mold segments 106 are positioned circumferentially about first mold body 102 (the circumferential direction is denoted by arrow C while the radial direction is denoted by arrow R) with each mold segment 106 located circumferentially adjacent to two other mold segments 106. For tire mold 100, a second plurality of discrete mold segments 106 are also positioned about second mold body 104 (see FIGS. 9A and 9B) and would have a top view substantially identical to FIG. 1. First mold body 102 with tread mold segments 106 as shown in FIG. 1 will be used by way of example—it being understood that second mold body 104 would have an identical construction and operation in all important aspects. For this exemplary embodiment of tire mold 100, nine tread mold segments 106 are shown with mold features 112 and 114 for sculpting the tread and other features of the tire. However, in other embodiments of the present invention, a different number of tread mold segments having a different appearance and/or different tread features may also be used. Although the present invention is not limited to a tire having any particular tread features, mold features 114 for the tire shoulder can e.g., cause tread mold segments 106 to stick to the tire as it is being removed from mold 100.

Tire mold 100 is shown in FIG. 1 with tread mold segments 106 shown in a position they would occupy when mold bodies 102 and 104 are in a closed position with a tire (not shown) positioned therebetween so as to force circumferentially adjacent tread mold segments 106 into contact with each other along an interface 110. Each tread mold segment 106 includes a pair of opposing shoulders 116, 118 configured to abut with the opposing shoulders 116, 118 of circumferentially adjacent tread mold segments 106 at a pair of interfaces 110 when tire mold 100 is in the closed position as shown. For example, first shoulder 116 of tread mold segment 106a abuts against the second shoulder 118 of circumferentially adjacent tread mold segment 106b. Similarly, second shoulder 118 of tread mold segment 106a abuts against first shoulder 116 of circumferentially adjacent tread mold segment 106c.

Figure 2:
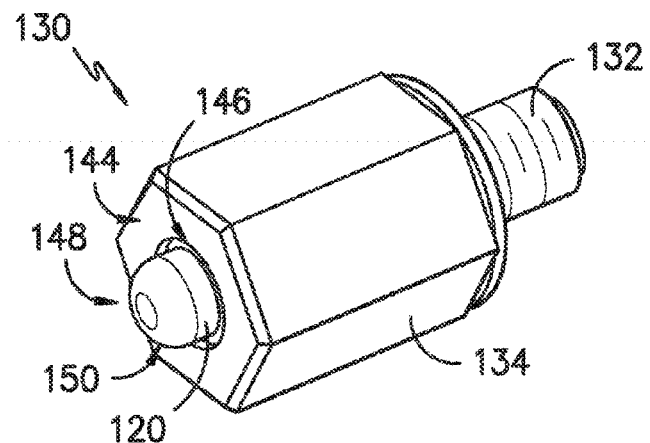
FIG. 2 illustrates a perspective view of an exemplary embodiment of a shock assembly of the present invention.
Figure 3:
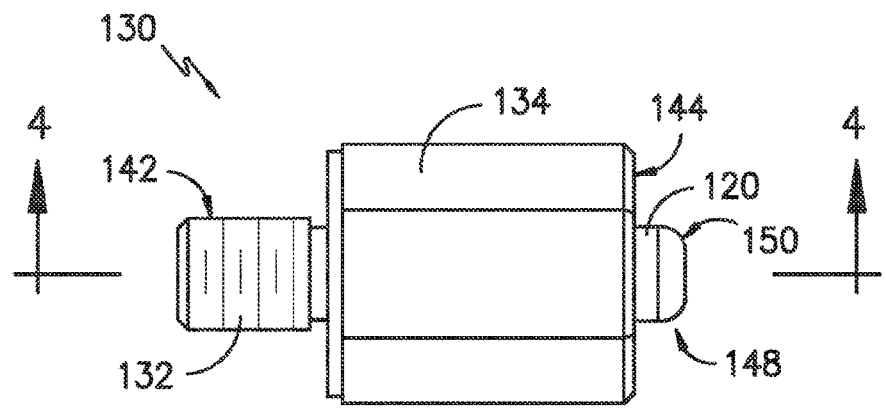
FIG. 3 is a side view of the exemplary shock assembly of FIG. 2.
Figure 4:
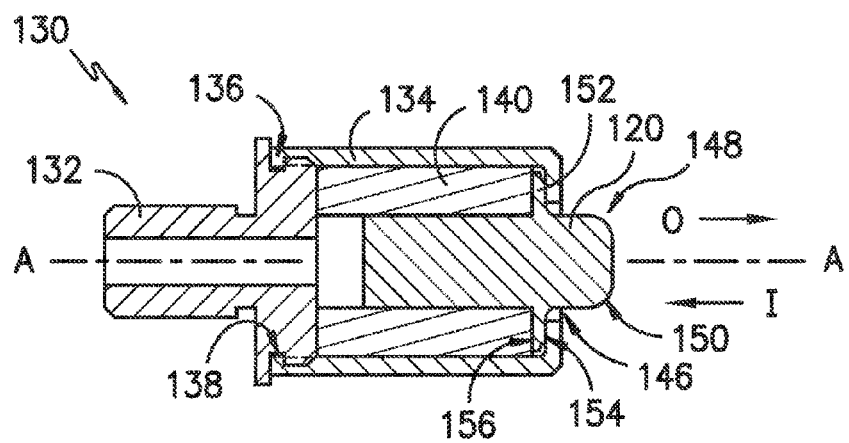
FIG. 4 provides a partial cross-sectional view of the exemplary shock assembly of FIGS. 2 and 3 as taken along line 4-4 of FIG. 3.

A recess 162 is located between circumferentially adjacent tread mold segments 106 where a shock assembly 130 is positioned. Referring now to FIGS. 2, 3, and 4, an exemplary embodiment of a shock assembly 130 is illustrated. Shock assembly 130 includes an impact absorber 120 received at least partially within a housing 134 and slidable along axis A-A within housing 134. A first fastener 132 is provided for securing shock assembly 130 to a tread mold segment 106. For example, surface 142 (FIG. 3) of first fastener 132 can be equipped with threads or other features for complementary attachment to a tread mold segment 106. Housing 134 includes a rim 136 (FIG. 4) received into a groove 138 formed in first fastener 132 so as to connect housing 134 therewith.

Impact absorber 120 includes a distal end 148 that extends through an aperture 146 in an outward face 144 of housing 134 towards a circumferentially adjacent tread mold segment 106. Distal end 148 has a rounded contact surface 150 as will be further described below. Impact absorber 120 also includes an annular flange 152 having an outward surface 154 (FIG. 4) that is configured to contact housing 134 and limit the movement of impact absorber 120 along the direction of arrow O out of housing 134. Impact absorber is movable along the directions of both arrow O and arrow I (out and in) with respect to housing 134 but is urged in the direction of arrow O towards a circumferentially adjacent tread mold segment 106 by a biasing member 140. More particularly, biasing member 140 contacts annular flange 152 along an inward surface 156 positioned in an opposing manner to outward surface 154. As such, biasing member 140 can be constructed as e.g., a spring that is compressed between the housing 134 and the inward surface 156 of annular flange 152 so as to bias impact absorber 120 along the direction of arrow O and into contact with housing 134 as shown. As distal end 148 of impact absorber 120 makes contact with a circumferentially adjacent mold segment 106, impact absorber 120 can be forced to slide in the direction of arrow I along axis A-A so as to further compress biasing member 140.

Figure 5:
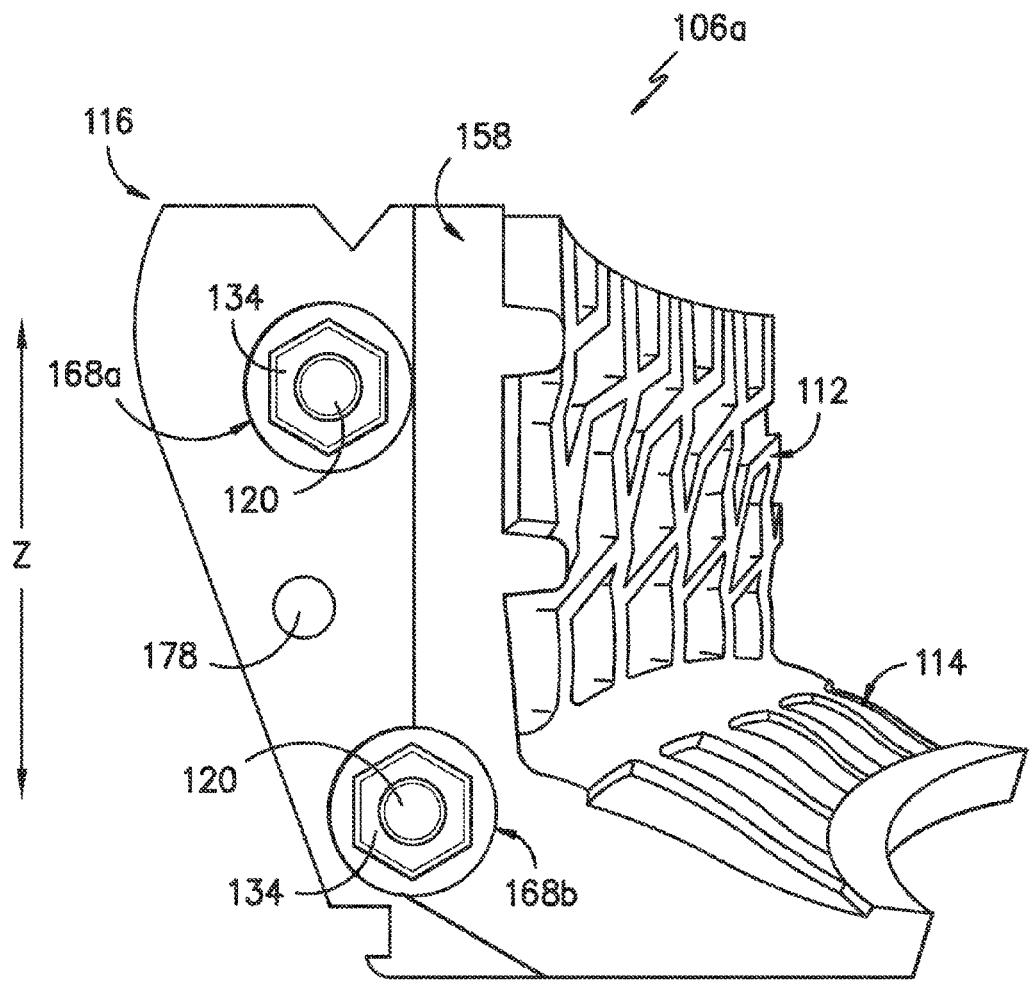
FIG. 5 is an end view of one shoulder of an exemplary tread mold segment of the present invention.

As shown in FIG. 5, each impact absorber 120 (along with shock assembly 130) is supported by a first shoulder 116 of each tread mold segment 106. For this exemplary embodiment, each tread mold segment 106 includes a pair of impact absorbers 120 spaced apart along the Z-axis (the same direction along which mold bodies 102 and 104 move to open and close tire mold 100). However, in other embodiments of the invention, a different number of impact absorbers 120 may be used along a shoulder of a tread mold segment. Impact absorbers 120 along with shock assemblies 130 are received into first openings 168 formed in first shoulder 116 and spaced apart along the Z-axis as shown. By way of example, first fastener 132 (connected with impact absorber 120 as previously described) can be used to secure impact absorber 120 to tread mold segment 106 though first opening 168.

Figure 8:
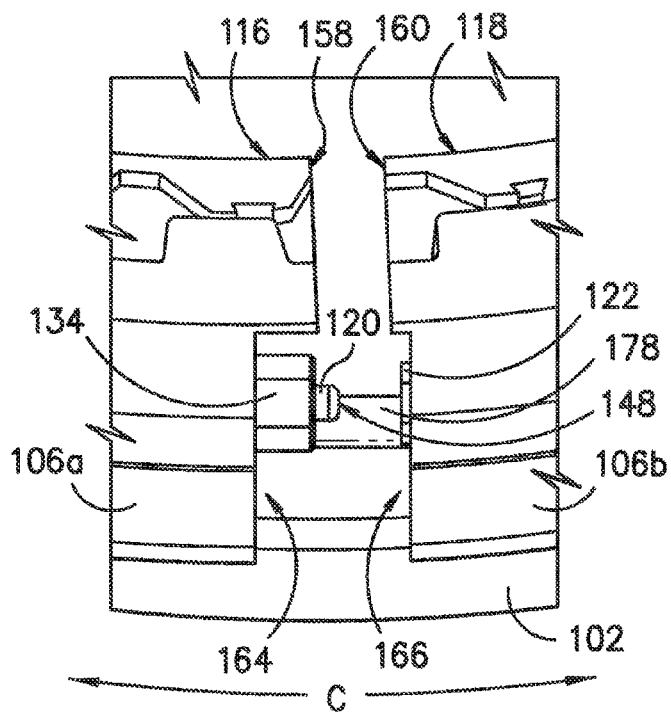
FIG. 8 is another top view of the circumferentially adjacent tread mold segments that are separated as might occur when e.g., a tire is removed from the tire mold.

Referring now to FIGS. 5 and 8, first shoulder 116 of each tread mold segment 106 includes a first contact surface 158 that is configured for contact with the second contact surface 160 of a circumferentially adjacent tread mold segment 106 (tread mold segments 106a and 106b are shown by way of example in FIG. 8 and, along with 106c, are used as examples of circumferentially adjacent tread mold segments 106 in this description). A first recessed portion 164 (forming part of overall recess 162) is located radially outward of first contact surface 158 in tread mold segment 106a. A second recessed portion 166 (forming part of overall recess 162) is located radially outward of second contact surface 160 in a circumferentially adjacent tread mold segment 106b. As shown in FIG. 5, for this exemplary embodiment of tread mold segment 106, first opening 168a (along with an impact absorber 120) is located entirely within recessed portion 164 while first opening 168b (along with another impact absorber 120) is located partially within recessed portion 164 and partially within first contact surface 158. A synchronization pin 178 is located between first openings 168a and 168b as shown—the operation of which will be described below.

Figure 6:
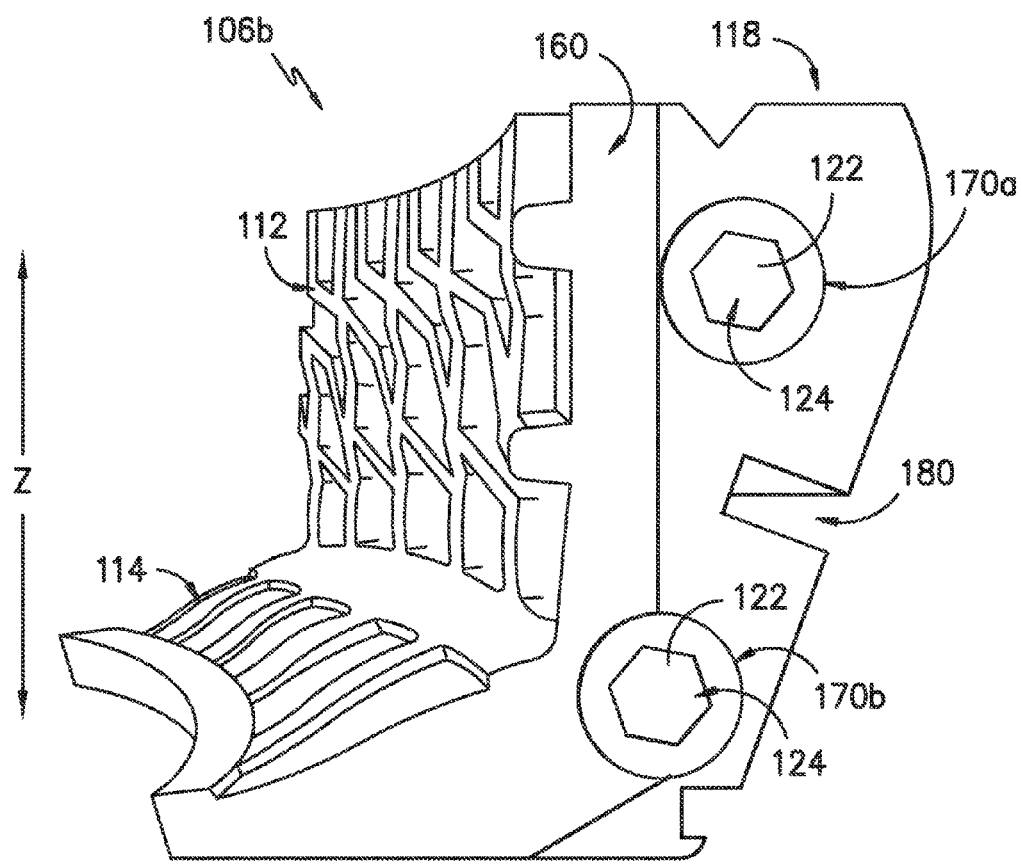
FIG. 6 is another end view of the exemplary tread mold segment of FIG. 5 showing an opposing shoulder.

As shown in FIG. 6, a pair of contact elements 122 is supported by second shoulder 118 of each tread mold segment 106. For this exemplary embodiment, contact elements 122 are spaced apart along the Z-axis and received into a pair of second openings 170a and 170b formed in second shoulder 118. As with impact absorbers 120, in other embodiments of the invention, a different number of contact elements 122 may be used along a shoulder of a tread mold segment. Each contact element 122 includes an impact absorber contact surface 124 aligned for contact with an impact absorber 120 supported by a circumferentially adjacent tread mold segment 106. Each contact element 122 is connected with a second fastener 172 (FIG. 11) that is used to secure contact element 122 to tread mold segment 106 though a respective opening 170 in second shoulder 118. Also, for this exemplary embodiment, contact element 122 is non-biased in that no spring or other biasing element is used to support contact element 122. In one exemplary embodiment of the invention, impact absorbers 120 and contact elements 122 are constructed from e.g., a case hardened steel.

Referring now to FIGS. 6 and 8, for this exemplary embodiment of tread mold segment 106, second opening 170a (along with a contact element 122) is located entirely within second recessed portion 166. Second opening 170b (along with another contact element 122) is located partially within second recessed portion 166 and partially within second contact surface 160. A slot 180 for receipt of synchronization pin 178 is located between first holes 170a and 170b as shown—the operation of which will be described below.

Figure 7:
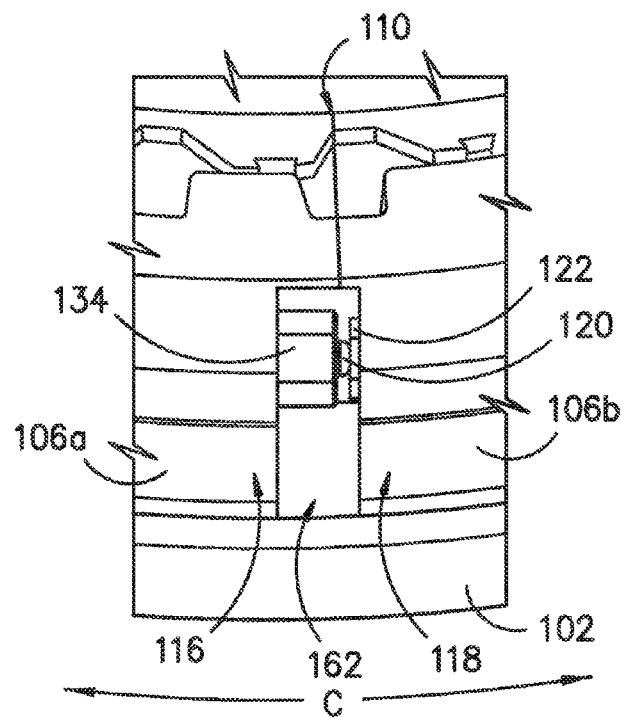
FIG. 7 is a top view of the interface between circumferentially adjacent tread mold segments when the mold is in a closed position.
Figure 9A:
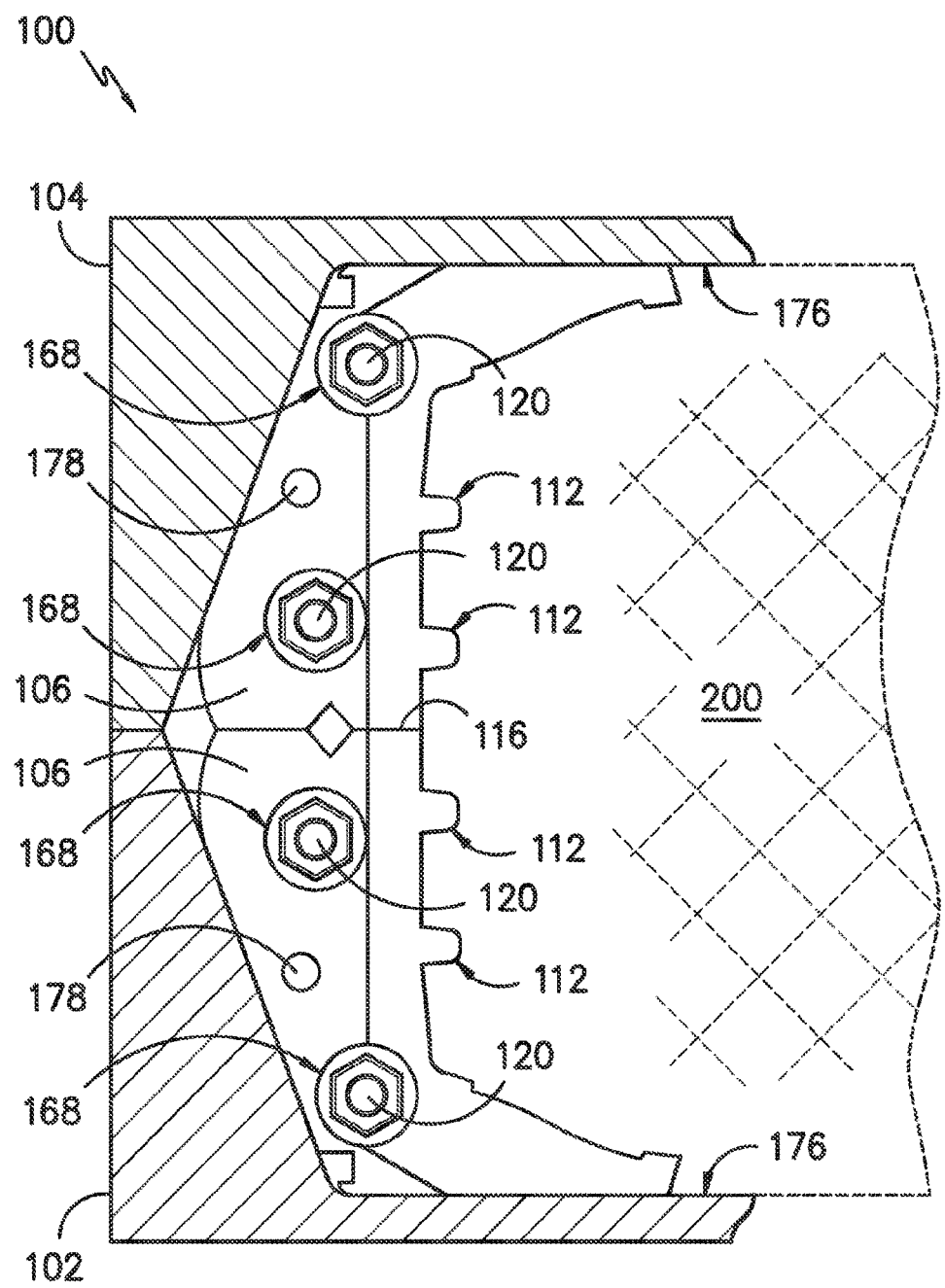
FIG. 9A is a cross-sectional view of an exemplary mold with first and second mold bodies (e.g., top and bottom mold bodies) and an end view of exemplary tread mold segments showing the position of the tread mold segments relative to the mold bodies when the tire mold is in a closed position.

FIGS. 7 and 9A show tire mold 100 in a closed position so as to cure and mold tire 200. In such closed position, first contact surface 158 of tread mold segment 106a engages second contact surface 160 of circumferentially adjacent tread mold segment 106b at interface 110 while first recessed portion 164 and second recessed portion 166 formed recess 162. As the same time, for each shock assembly 130, rounded contact surface 150 on distal end 148 of impact absorber 120 is in contact with the impact absorber contact surface 124 of contact element 122 of an adjacent tread mold segment 106b. Impact absorber 120 may be slightly depressed into housing 134 in this closed position.

Figure 9B:
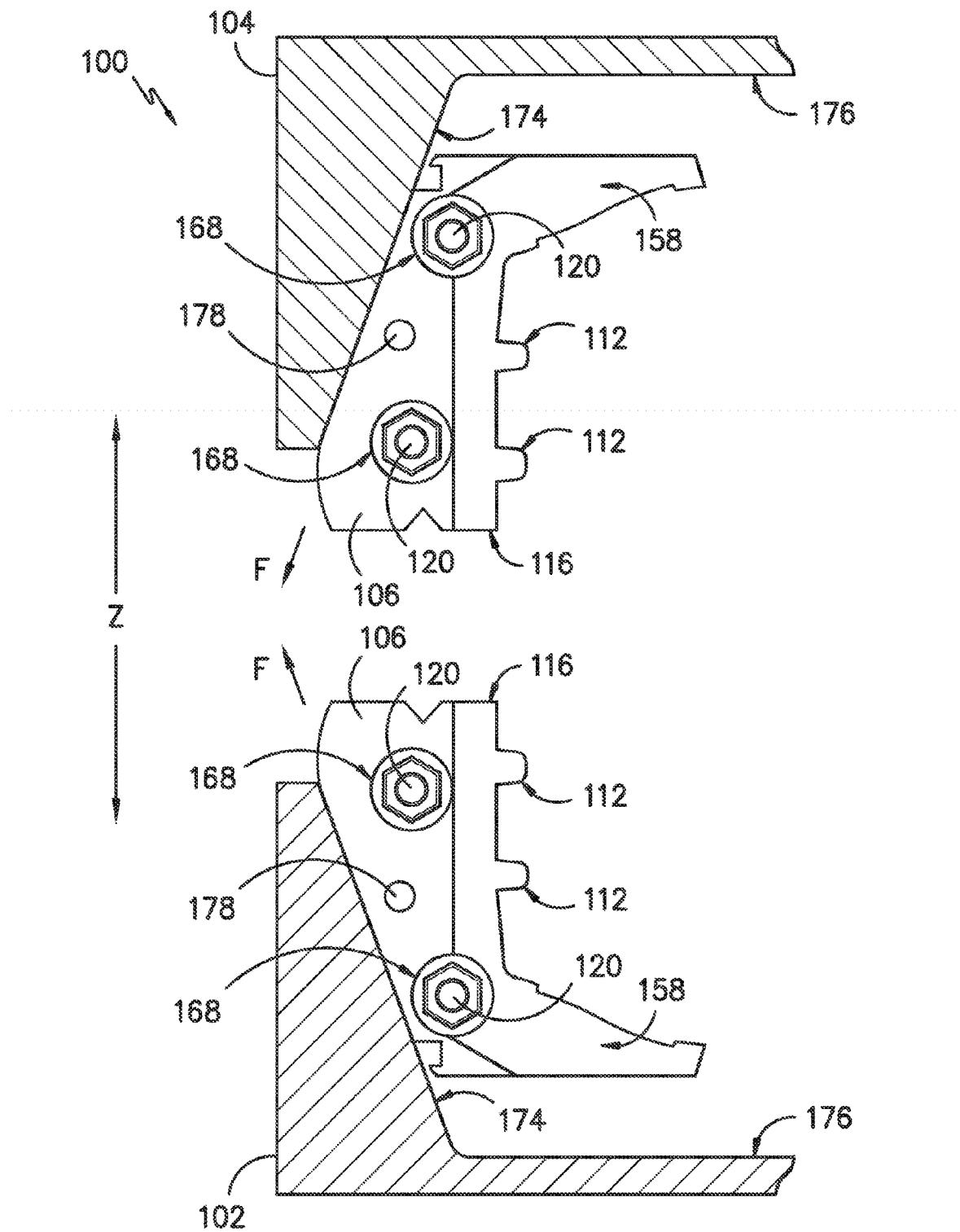
FIG. 9B is also a cross-sectional view of the exemplary mold bodies of FIG. 9A and an end view of the exemplary tread mold segments showing the position of the tread mold segments relative to the mold bodies as a tire is being removed so as to shift the tread mold segments away from the mold bodies along the direction of arrows F.

FIGS. 8 and 9B depict tire mold 100 in a position where tire 200 is being removed from tire mold 200 causing separation of circumferentially adjacent tread mold segments 106 as tire 200 is removed. After the mold is opened by separating first mold body 102 from second mold body 104, tire 200 is removed which causes tread mold segments 106 to move along frustoconical surfaces 174 away from back surface 176 in the direction of arrows F as shown in FIG. 9B. Such removal of tire 200 also causes adjacent tread mold segments 106a and 106b to be separated from each other by some distance as depicted in FIG. 8. For example, as shown, first contact surface 158 may break from contact with second contact surface 160 as shown.

One or more biasing elements (not shown) of tire mold 100 are connected between tread mold segments 106 and their respective mold bodies 102 or 104. As tire 200 is being removed, these biasing elements will urge tread mold segments 106 in a direction opposite to arrows F that are shown in FIG. 9B. Accordingly, as tire 200 is removed, tread mold segments 106 are released and will be urged towards the back 176 of a respective mold body 102 and 104. In the absence of impact absorbers 120 and contact elements 122, the contact surfaces 158 and 160 of circumferentially adjacent tread mold segments such as 106a and 106b would impact each other—potentially damaging the tread mold segments and affecting the appearance of subsequently molded tires. For example, tread mold segments 106 may be constructed of aluminum, which can be readily damaged by such impact.

However, as shown in FIG. 8, the distal end 148 of impact absorber 120 extends along circumferential direction C slightly past first contact surface 158. Thus, as tread mold segments 106a and 106b move along frustoconical surface 174 towards back surface 176 and towards each other, impact absorbers 120 of tread mold segment 106a will impact with contact elements 122 of tread mold segment 106b so as to prevent a potentially damaging impact between such tread mold segments. Tread mold segments 106a and 106b of tire mold 100 will then return to the position shown in FIG. 10.

Figure 10:
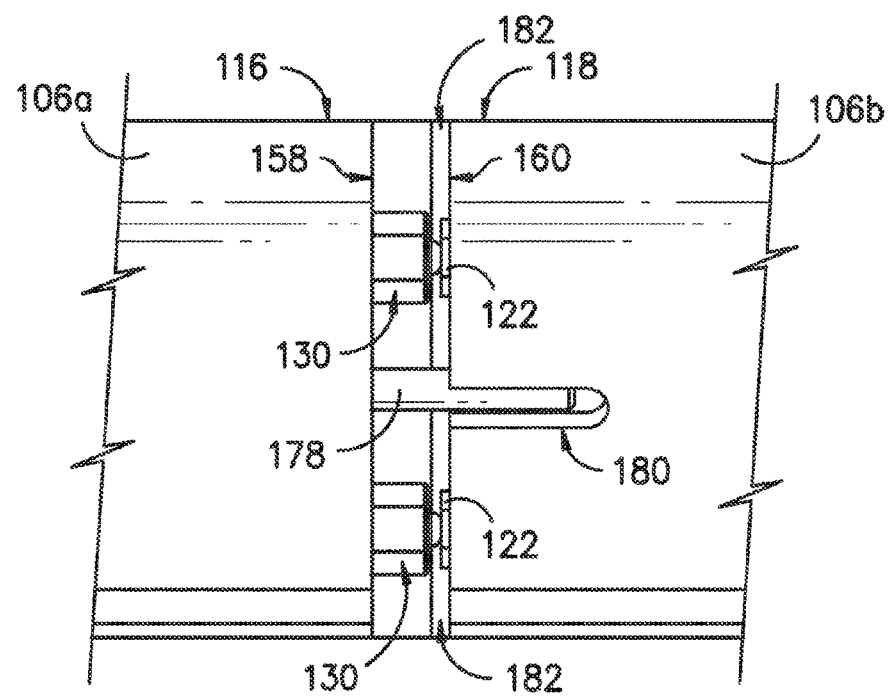
FIG. 10 is a side view of the interface between exemplary tread mold segments of previous figures when the tire mold is in an open position.

More particularly, FIG. 10 depicts the relative position of tread mold segments 106a and 106b after tire 200 is removed and tire mold 100 is left in an open position. As shown, impact absorbers 120 along first shoulder 116 of tread mold segment 106a are in contact with contact elements 122 along second shoulder 118 of circumferentially adjacent tread mold segment 106b. At the same time, when tire mold 100 is in the open position shown in FIG. 10, a slight gap 182 may be present between first and second contact surfaces 158 and 160 (as compared to the closed position shown in FIG. 7 where first and second contact surfaces 158 and 160 are in contact with each other). Thus, for this exemplary embodiment of tire mold 100, impact absorbers 120 and contact elements 124 remain in contact with each other whether mold 100 is in the open position (FIG. 10) or closed position (FIGS. 7 and 9A) and may separate only when a tire is being removed therefrom (FIGS. 8, 9B, and 11).

Figure 11:
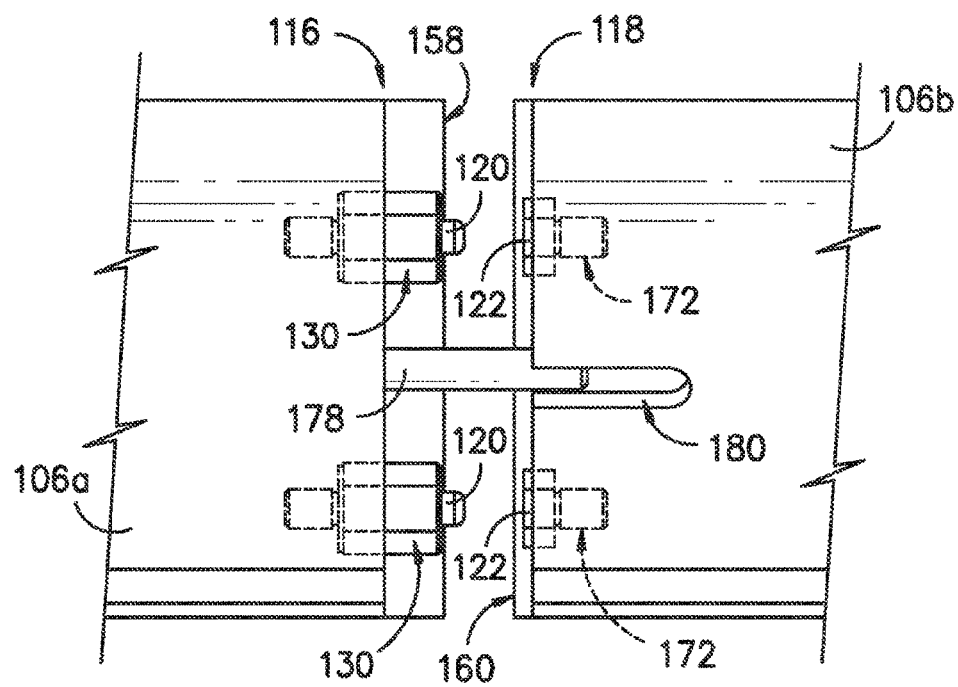
FIG. 11 is another side view of the interface between exemplary tread mold segments of previous figures showing their relative position when e.g., a tire is being removed so as to lift and separate the tread mold segments. The side view of FIGS. 10 and 11 are along the side of the tread mold segments that makes contact with the mold bodies.

Referring now to FIGS. 10 and 11, each pair of circumferentially adjacent tread mold segments 106 includes a corresponding synchronization pin 178 for receipt into a slot 180. More particularly, for this exemplary embodiment, the first shoulder 116 of each tread mold segment 106 includes a synchronization pin 178 projecting therefrom along circumferential direction C. Synchronization pin 178 is received into a slot 180 defined by the second shoulder 118 of a circumferentially adjacent mold segment 106. During movement of tread mold segments 106 as described herein along frustoconical surfaces 174, synchronization pins 178 and slots 180 ensure that circumferentially adjacent tread mold segments such as 106a and 106b remained aligned with each other. More importantly, pins 178 and slots 180 ensure that impact absorber 120 and contact elements 122 remain substantially adjacent to each other along circumferential direction C so that the shoulders of each tread mold segment 106 will be protected as segments 106 are urged to the open position shown in FIG. 10 when a tire is removed.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A tire mold movable between a closed position and an open position, the tire mold comprising:
   a mold body; and
   a plurality of discrete tread mold segments positioned circumferentially about the mold body;
   wherein each tread mold segment comprises:
      a pair of opposing shoulders configured to abut with opposing shoulders of circumferentially adjacent tread mold segments when the tire mold is in the closed position, each pair of shoulders comprising a first shoulder defining a first opening and a second shoulder defining a second opening; wherein the first shoulder comprises a first contact surface configured for contact with a circumferentially adjacent tread mold segment and a first recessed portion that is positioned radially outward of the first contact surface; wherein the second shoulder comprises a second contact surface configured for contact with the first contact surface of a circumferentially adjacent tread mold segment and a second recessed portion that is positioned radially outward of the second contact surface;
      at least one impact absorber supported by the first shoulder, the impact absorber configured for movement in and out of the first shoulder, the impact absorber biased towards a circumferentially adjacent tread mold segment;
      a synchronization pin extending from the first shoulder along a circumferential direction of the tire mold;
      at least one contact element received within the second opening, the contact element positioned in contact with the impact absorber of a circumferentially adjacent tread mold segment in both the open position and the closed position of the tire mold;
      a slot defined by the second shoulder and configured for receipt of the synchronization pin of a circumferentially adjacent tread mold segment and
      wherein the at least one impact absorber extends along the circumferential direction at least partly past the first contact surface and into the second recessed portion of the circumferentially adjacent tread mold segment when the mold is in the closed position.

2. A tire mold as in claim 1, wherein each tread mold segment further comprises a shock assembly supported by the first shoulder, the shock assembly comprising:
- a first fastener for attaching the shock assembly to the tread mold segment;
- a housing connected to the fastener with the at least one impact absorber received at least partially within the housing;
- a biasing member located within the housing and positioned to urge the at least one impact absorber towards the circumferentially adjacent tread mold segment.

3. A tire mold as in claim 2, wherein the housing comprises: an outward face, the outward face defining an aperture through which a distal end of the impact absorber protrudes towards a circumferentially adjacent tread mold segment.

4. A tire mold as in claim 3, wherein the impact absorber comprises an annular flange configured to contact the housing around the aperture and limit the amount of movement of the impact absorber through the aperture.

5. A tire mold as in claim 4, wherein the annular flange is in contact with the biasing member.

6. A tire mold as in claim 5, wherein the annular flange further comprises an inward surface positioned in an opposing manner to the outward face, and wherein the biasing member further comprises a spring that is compressed between the housing and the inward surface.

7. A tire mold as in claim 1, further comprising a first fastener connected with the at least one impact absorber and received in complementary manner into the first opening.

8. A tire mold as in claim 7, further comprising a second fastener received in a complementary manner into the second opening, the second fastener connected with the contact element.

9. A tire mold as in claim 1, wherein the at least one impact absorber comprises a distal end having a rounded contact surface.

10. A tire mold as in claim 1, wherein the contact element is non-biased.

11. A tire mold as in claim 1, wherein the plurality of tread mold segments are arranged so that the first shoulder of each tread mold segment is adjacent to the second shoulder of a circumferentially adjacent tread mold segment.

12. A tire mold as in claim 1, wherein the tread mold segments comprise aluminum, and wherein the at least one impact absorber and the at least one contact element comprise steel.

13. A tire mold as in claim 1, wherein the at least one impact absorber comprises a pair of impact absorbers supported along the first shoulder, and wherein the at least one contact element comprises a pair of contact elements supported along the second shoulder.

14. A tire mold as in claim 1, wherein each tread mold segment includes one or more mold features for molding along sidewalls of a tire.

15. A tire mold as in claim 1, wherein the position of the at least one contact element remains fixed as the tire mold moves between the open position and the closed position.

16. A tire mold movable between a closed position and an open position, the tire mold comprising:
- a mold body;
- a plurality of discrete tread mold segments positioned circumferentially about the mold body;
- wherein each tread mold segment comprises
  - a pair of opposing shoulders configured to abut with opposing shoulders of circumferentially adjacent tread mold segments when the tire mold is in the closed position, each pair of shoulders comprising a first shoulder and a second shoulder;
  - the first shoulder comprising a first contact surface positioned for contact with a circumferentially adjacent tread mold segment, the first shoulder comprising a first recessed portion that is positioned radially outward of the first contact surface;
  - the second shoulder comprising a second contact surface positioned for contact with a circumferentially adjacent tread mold segment, the second shoulder comprising a second recessed portion that is positioned radially outward of the second contact surface;
  - at least one impact absorber positioned in a first opening defined in the first recessed portion, the impact absorber configured for movement in and out of the first shoulder, the impact absorber biased towards a circumferentially adjacent tread mold segment and extending along the circumferential direction at least partly past the first contact surface and into a second recessed portion of the circumferentially adjacent tread mold segment when the mold is in the closed position; and
  - at least one contact element supported by the second shoulder, the contact element positioned in contact with the impact absorber of a circumferentially adjacent tread mold segment in both the open position and the closed position of the tire mold.

17. A tire mold movable between a closed position and an open position as in claim 16, wherein the position of the at least one contact element remains fixed as the tire mold moves between the open position and the closed position.

* * * * *